(12) United States Patent
Jutla

(10) Patent No.: US 8,107,620 B2
(45) Date of Patent: Jan. 31, 2012

(54) SIMPLE AND EFFICIENT ONE-PASS AUTHENTICATED ENCRYPTION SCHEME

(75) Inventor: Charanjit S. Jutla, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 11/688,890

(22) Filed: Mar. 21, 2007

(65) Prior Publication Data

US 2008/0232591 A1 Sep. 25, 2008

(51) Int. Cl.
*H04L 9/28* (2006.01)
(52) U.S. Cl. ......................................................... 380/28
(58) Field of Classification Search ................ 380/28, 380/277
See application file for complete search history.

(56) References Cited

U.S. PATENT DOCUMENTS

| | | | |
|---|---|---|---|
| 5,297,208 A | 3/1994 | Schlafly et al. | |
| 5,794,207 A * | 8/1998 | Walker et al. | 705/77 |
| 6,226,742 B1 | 5/2001 | Jakubowski et al. | |
| 6,963,976 B1 * | 11/2005 | Jutla | 713/181 |
| 7,093,126 B1 | 8/2006 | Jutla | |
| 2002/0048364 A1 | 4/2002 | Gligor et al. | |
| 2002/0071552 A1 * | 6/2002 | Rogaway | 380/37 |
| 2003/0091192 A1 | 5/2003 | Chen et al. | |
| 2004/0117614 A1 * | 6/2004 | Minnick et al. | 713/153 |
| 2006/0285684 A1 | 12/2006 | Rogaway | |

OTHER PUBLICATIONS

"Computing with Very Weak Random Sources"; Srinivasan, A,; Zuckerman, D; Foundations of Computer Science, 1994 Proceedings., 35th Annual Symposium on Nov. 20-22, 1994 pp. 264-275.
"A Randomness-Efficient Sampler for Matrix-valued Functions and Applications"; Wigderson, A.; Xiao, D.; Foundations of Computer Science, 2005. FOCS 2005.46th Annual IEEE Symposium on Oct. 23-25, 2005 pp. 397-406; and.
"Randomness Extractors and Their Many Guises"; Vadhan, S.P.; Foundations of Computer Science, 2002. Proceedings. The 43rd Annual IEEE Symposium on Nov. 16-19, 2002 p. 9.

* cited by examiner

*Primary Examiner* — Brandon Hoffman
(74) *Attorney, Agent, or Firm* — Scully, Scott, Murphy & Presser, P.C.; Preston J. Young, Esq.

(57) ABSTRACT

The present invention provides encryption schemes and apparatus, which are more efficient than the existing single pass authenticated encryption schemes, while providing the same level of security. The initial vectors, which are an essential part of these schemes, are chosen in an incremental and safe fashion. This also leads to an incremental method for generating the pair-wise differentially uniform sequences or XOR-universal sequences which are another essential part of such schemes. The incrementality of the generation of these sequences extends to even across different plain-text messages being encrypted, leading to substantial savings in time to encrypt. A further step of encryption is shown to be redundant and leads to savings over earlier schemes. Another embodiment describes splitting the plain-text blocks into two sets, and using the block-cipher in encrypt mode on one set and the block-cipher in decrypt mode on the other set, leading to beneficial hardware solutions.

35 Claims, 20 Drawing Sheets

SIMPLE AND EFFICIENT ONE-PASS AUTHENTICATED ENCRYPTION SCHEME

BACKGROUND OF THE INVENTION

Field of Invention

This invention relates to a method and apparatus for cryptographically transforming an input message into an output message while assuring message integrity.

Cryptographic systems are known in the data processing art. In general, these systems operate by performing an encryption operation on a plain-text input message, using an encryption key, and a symmetric key block cipher, producing a cipher-text message. The encrypted message may then be sent over an unreliable and insecure channel to a receiver who shares the secret key. The receiver of the encrypted message performs a corresponding decryption operation, using the same key to recover the plain-text block. Because the same key is used by both the sender and receiver of the message, the process is referred to as a "symmetric key" process.

There is a related issue of message integrity. To elaborate, although the receiver of the cipher-text message can decrypt the cipher-text, the receiver is not assured that the cipher-text was not accidentally or maliciously altered during transmission. To ensure message integrity, the cipher-text message comes accompanied with a message authentication code (MAC). This MAC is generated by the sender from the cipher-text using a cryptographic hash function.

Recently, various one-pass authenticated encryption schemes have been proposed, including IACBC, IAPM, which are described in the U.S. Pat. Nos. 7,093,126 and 6,963,976. These schemes provide both encryption and message integrity. Further variants of these schemes are described in the scheme OCB in U.S. Pat. No. 7,046,802.

However, these schemes require an extra step in their mechanism, which can be 10 to 100% more computationally expensive. Further, these schemes fail to utilize the hardware and software optimizations possible to the full extent.

SUMMARY OF THE INVENTION

An object of the present invention is to provide improved encryption schemes and apparatus, which securely generate a cipher-text, which in itself contains checks for assuring message integrity.

Another object of this invention is to provide encryption and decryption schemes and apparatus which generate a cipher-text with message integrity in a single pass with less additional computational cost, while retaining at least the same level of security, as schemes based on a MAC, and other authenticated encryption schemes.

These and other objects are attained with encryption/decryption methods and apparatus of the present invention. The methods and apparatus use a predetermined block cipher, which supports encryption and decryption of a fixed block size. The methods and apparatus also use a key for the block cipher, which is usually kept secret.

An embodiment of a method comprises the steps of encrypting a plain-text message using a user supplied safe initial vector by dividing the plain-text message into a multitude of plain-text blocks and encrypting the plain-text blocks using the safe initial vector and the block cipher to form a multitude of cipher-text blocks. A single pass technique is used in this process to embed a message integrity check in the cipher-text block, again using the safe initial vector. The method further comprises the steps of decrypting the cipher-text blocks using the block cipher and the same key to reform the plain-text blocks, and testing the message integrity check in the cipher-text blocks to test the integrity of the reformed plain-text blocks.

It is often advantageous to employ embodiments in which the message integrity check is embedded in the cipher-text blocks by using a safe initial vector, expanding this safe initial vector to generate a set of pseudo random numbers, which may be dependent, but are pair-wise differentially uniform in the sense to be defined below, and using the set of pseudo random numbers to embed the message integrity check in the cipher-text blocks as the cipher-text blocks are being formed. In these embodiments, during the decryption process, the safe initial vector and the set of pseudo random numbers are obtained from the cipher-text blocks, and as the cipher-text blocks are decrypted, these set of pseudo random numbers are used to reform the plain-text blocks from the cipher-text blocks. Also, the testing step advantageously includes the step of applying a predetermined test to the re-formed plain-text blocks to test the integrity of the re-formed plain-text blocks.

In another embodiment, the message integrity check is embedded in the cipher-text blocks and a partial-block tag. In such an embodiment, the re-formed plain-text blocks are tested against the tag using a predetermined test, which may include another encryption or decryption step.

In another embodiment, the method comprises the steps of encrypting a plain-text message using a user supplied initial vector (IV) by dividing the plain-text message into a multitude of plain-text blocks and encrypting the plain-text blocks by dividing them into two sets; and using the block cipher in encrypt mode on one set and the block cipher in decrypt mode on the other set to form a multitude of cipher-text blocks. The method further comprises the step of decrypting the cipher-text blocks by dividing them into corresponding two sets; and using the block cipher in encrypt mode on respective one set and block cipher in decrypt mode on the respective other set to reform the plain-text blocks. The message integrity checks are embedded as in earlier described embodiments.

When encrypting a sequence of t plain-text messages, each of length up to len[i] blocks, with index i ranging from 1 to t, a sequence of n-bit numbers (or initial vectors) $IV_1, IV_2, \ldots IV_t$ is called safe if for all message indices i, i1, ranging from 1 to t, with i different from i1, and numbers j ranging from 0 to len[i]+1, and j1 ranging from 0 to len[i1]+1, it is the case that $IV_i+j$ is not equal to $IV_{i1}+j1$.

In one embodiment the initial vectors for each message can be chosen randomly and independently, and with extremely high probability the initial vectors so chosen will be safe by above definition.

In another embodiment, for the first message to be encrypted using the same secret key, the initial vector can be set to 1. In other words, $IV_1$ can be initialized to 1. Inductively, from then on, the IV of the next message can be set to IV of the previous message plus the length of the previous message in integer blocks plus two. This makes the method to generate safe initial vectors incremental.

A sequence of n-bit random numbers $S_1, S_2, \ldots, S_m$ is called pair-wise differentially uniform if each $S_i$ is uniformly distributed, and for every i, i1, i not equal to i1, and i,i1 ranging from 1 to m, and for every n bit constant c, the probability that the n-bit exclusive-or of $S_i$ and $S_{i1}$ is same as c is at most two to the power negative n. Such sequences are also called XOR-universal in the cryptography literature.

Further benefits and advantages of the invention will become apparent from a consideration of the following detailed description, given with reference to the accompanying drawings, which specify and show example embodiments of the invention.

DETAILED DESCRIPTION OF THE PREFERRED EMBODIMENTS

In this specification and the drawings, a plain-text message is denoted by "P", and a cipher-text message is denoted by "C". The length of the plain-text and cipher-text are measured in blocks, where a block is the number of bits of input/output of a block cipher used in this construction. This number called block size will be designated n. Thus, if the plain-text P is of length m blocks, then the individual blocks of this message are designated $P_1, P_2, \ldots, P_m$. Similarly, the cipher-text blocks are designated $C_1, C_2, \ldots, C_m$.

Further still, we will be referring to several applications of the encryption procedure using the same key. Thus, for example, the same key may be used to encrypt plain text messages $P^1, P^2, \ldots, P^t$. The index of the message will be placed in the superscript, whereas the index of the block number in a particular message will be placed in the subscript.

Figure 1:
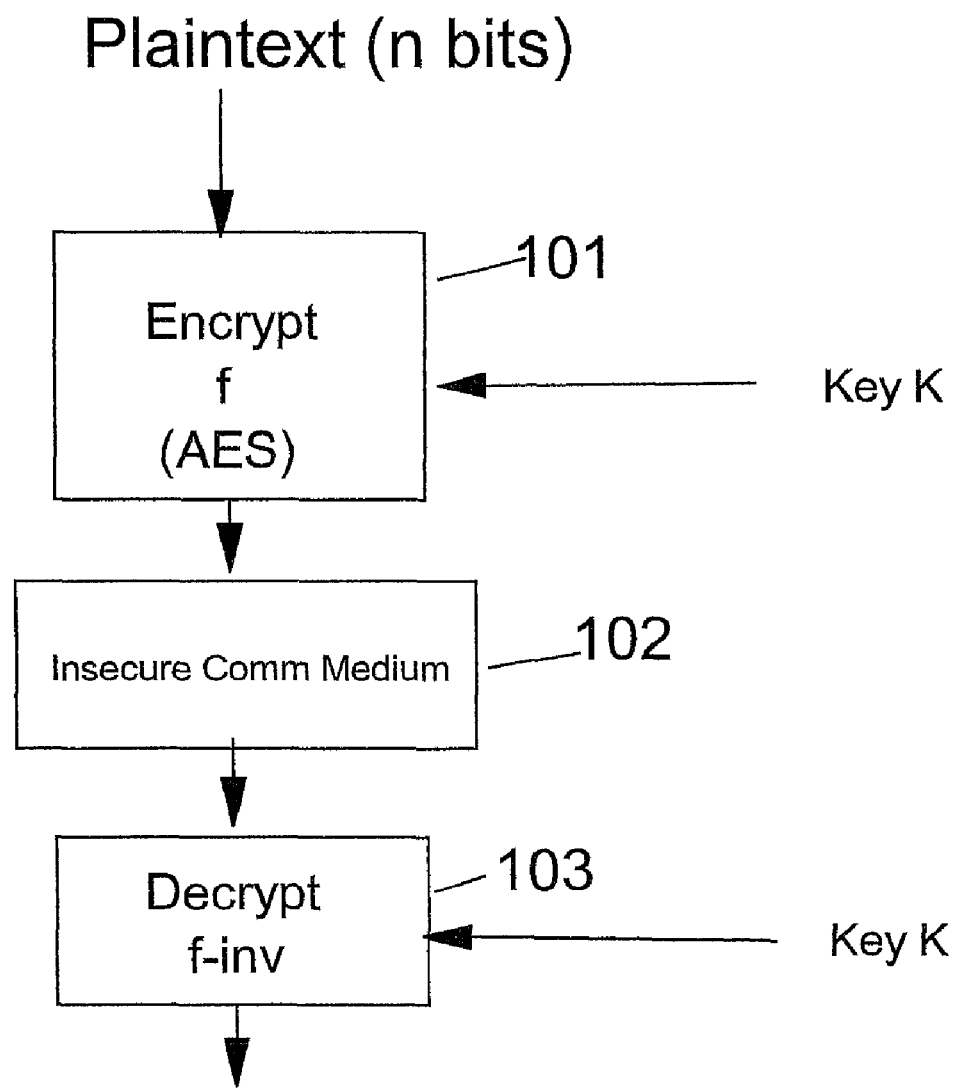
FIG. 1 generally illustrates a prior art encryption/decryption procedure.
Figure 2:
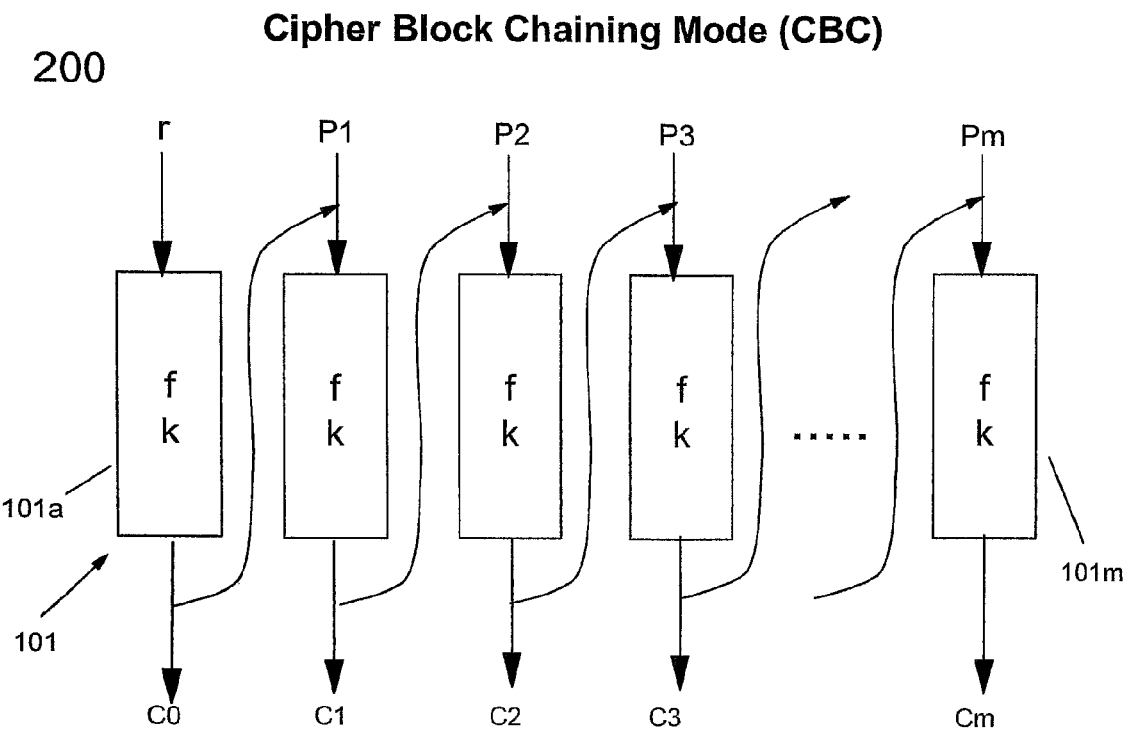
FIG. 2 shows a prior art encryption mechanism.
Figure 3:
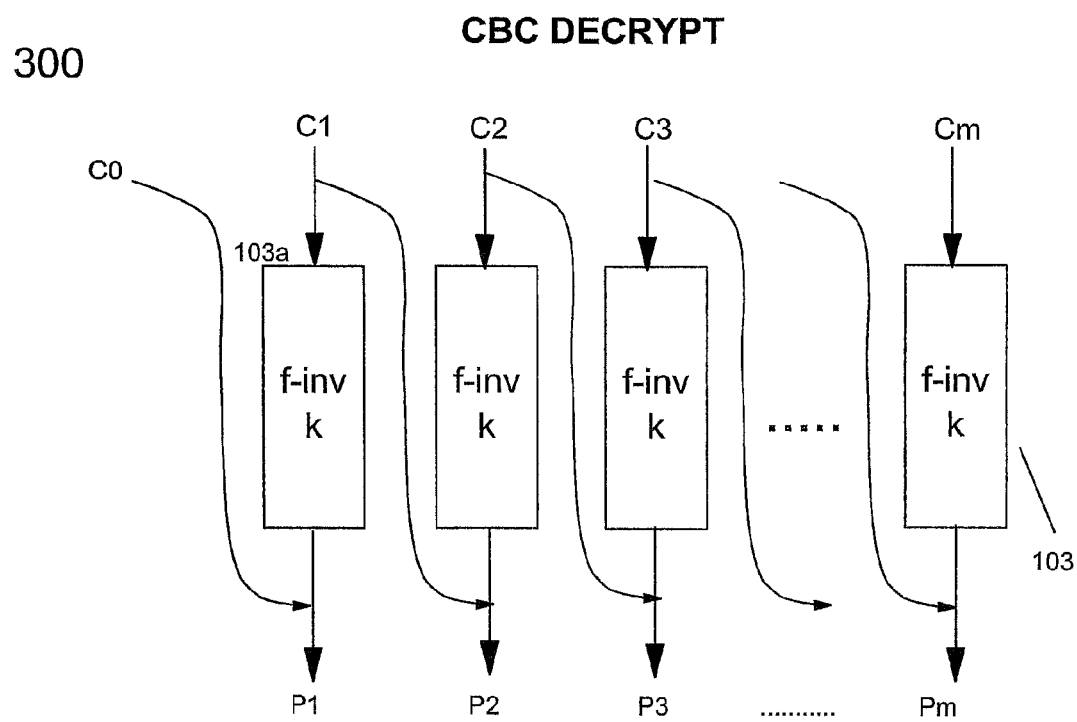
FIG. 3 shows a prior art decryption mechanism.

FIGS. 1-3 generally illustrate an encryption/decryption procedure of the type referred to as cipher block chaining (CBC). In this process, a sending party encrypts a plain-text message of a constant size, e.g. n=128 bits for AES, using a block cipher 101, and the encrypted message is sent over an insecure or non-secure communication medium 102 to a receiving party. This latter party uses the same block cipher in decrypt mode 103 to decipher the message. Note that both parties have access to the same secret key K.

FIGS. 2 and 3 respectively show the encryption and decryption mechanisms for messages of size multiple of the block-size of the underlying block-cipher. With reference to FIG. 2, mechanism 200 includes a series of cipher blocks 101 as in FIG. 1. Each cipher block is provided with the same key K. The first block 101a is also provided with a random number r that is n bits long. Each of the successive cipher blocks in the chain is provided with a respective one block (i.e. n bits) of the plain text and with the output of the previous block in the chain. Advantageously, for each of the cipher blocks after the first one, an exclusive or function is applied to the two text blocks applied to the cipher block. Each of the cipher blocks 101a-101m outputs a respective one block of the cipher-text.

With reference to FIG. 3, a mechanism 300 for decrypting long cipher-text blocks generated by 200, includes a series, or chain, of cipher blocks 103 in decrypt mode. Each block is provided with the same key K and with a respective one of the cipher-text blocks (each of n bits). For the first block 103a in chain 103, an exclusive or operation is applied to the output of the block and the first cipher-text block. For the other blocks in chain 103, an exclusive or operation is applied to the output of the block and the input of the previous block. The exclusive or operations performed on the outputs of the cipher blocks produce the original plain-text blocks.

FIGS. 4-10 illustrate an encryption/decryption process, which also guarantees message integrity, which is prior art. Generally, the encryption process includes three steps. The first step is the randomness generation and its expansion. The second step is the further expansion of the randomness, and the third step is the actual encryption of the plain text using the above-generated randomness to produce the cipher-text.

Figure 4:
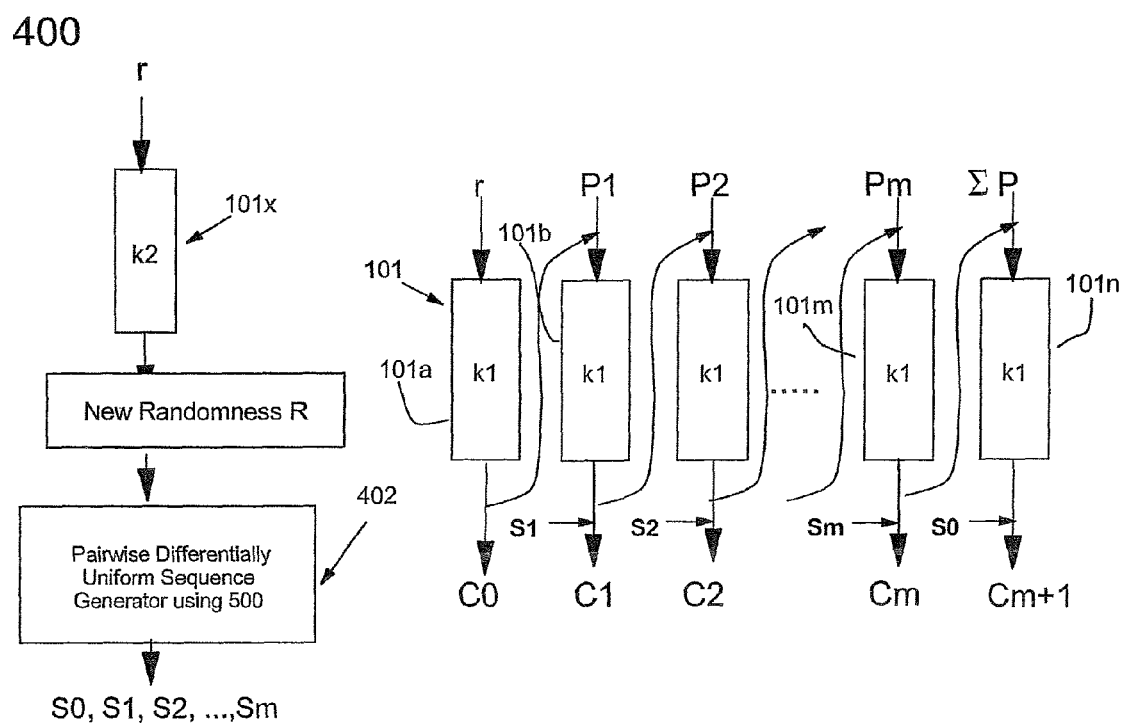
FIG. 4 illustrates a prior art encryption process that also guarantees message integrity.

FIG. 4 illustrates a prior art encryption process 400 that also guarantees message integrity. More specifically, in the first step, a random number r is generated. The randomness r may be generated by any of the well-known techniques to generate randomness. This number r is applied to the block cipher 101x with key K2 to produce a pseudo random number R. The number R could also be obtained by any other well-known means of expanding randomness.

This number R is fed into a pair-wise differentially uniform sequence generator 402. This generator, using a process discussed below, outputs a series of S values, S0, S1, S2, ... Sm, each of which is also n bits long.

Figure 5:
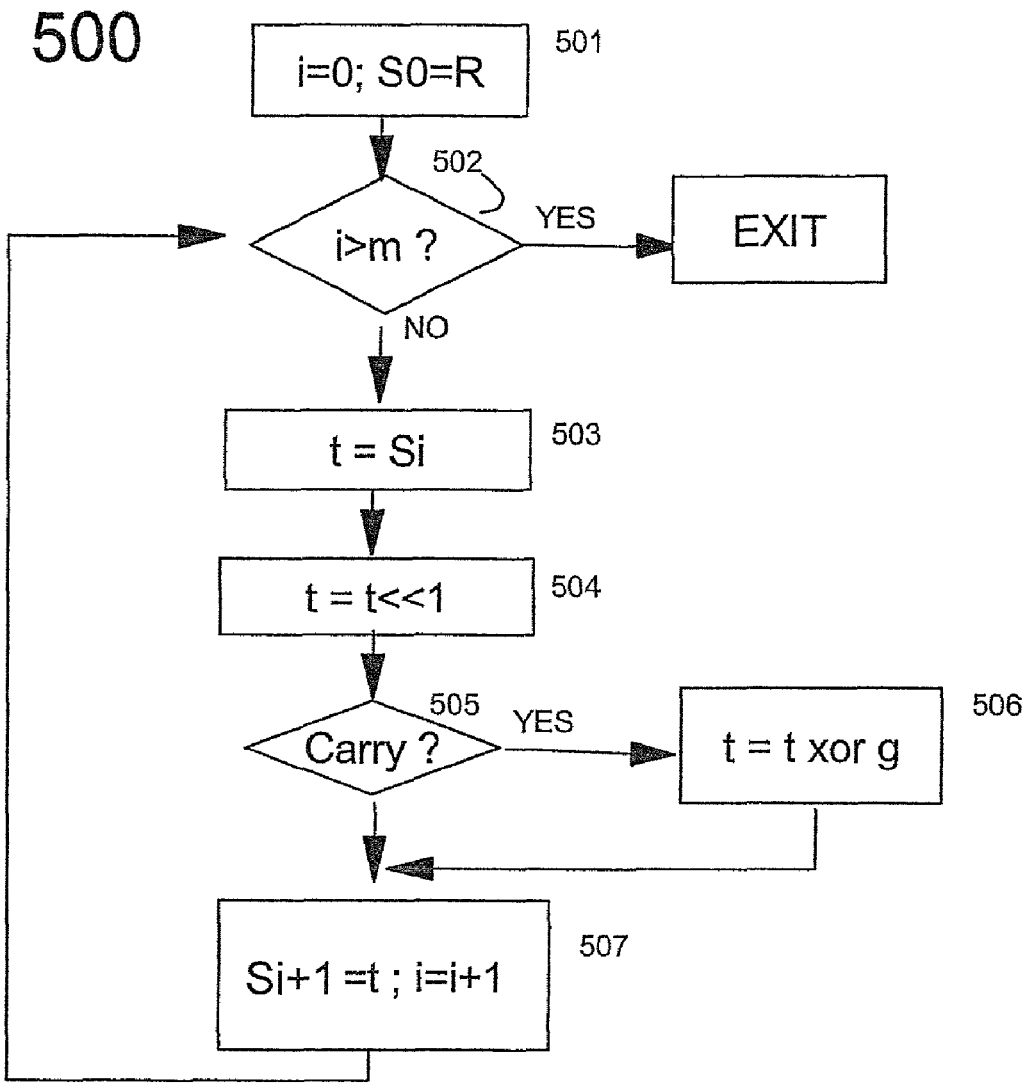
FIG. 5 is a flow chart showing how the generator of FIG. 4 operates.

FIG. 5 is a flow chart 500 showing how generator 402 works.

This generator may work as a well-known Linear Feedback Shift Register (LFSR). First a primitive polynomial g(x) representing the Galois Field $GF(2^n)$ is chosen. Such polynomials are well known and published in literature. Let g stand for the n-bit number representing $g(x)-x^n$. At step 501, a variable i is set equal to 0, and S0 is set equal to R; and then at step 502, i is compared to m. If i is greater than m, then the routine exits. Otherwise, the routine proceeds to 503, 504, 505. At step 503, the variable Si is copied into a temporary variable t. At step 504, t is left shifted by 1 bit. At step 505, it is checked if there was a carry produced from the previous shift operation. If so, the quantity g and t are combined by a bit-by-bit exclusive or operation to produce the new t. If there was no carry produced, then t is left intact. At step 507, variable Si+1 is set to t and I is incremented by 1, and the routine returns to step 502. An important advantage of this process is that the expansion does not require any cryptographic operations, like block cipher invocations.

With reference again to FIG. 4, after r and the S values are generated, the blocks of plain-text P1-Pm are encrypted to obtain the cipher-text blocks C0-Cm+1. A series of m+2 cipher blocks 101 are used to do this. Each of the cipher blocks is provided with the key K1. The first block 101a is also provided with the random number r. Each of the following cipher blocks, except the last one 101n, is provided with a combination of a respective one of the plain-text blocks and the output of the preceding cipher block. In particular, this combination is the result of the exclusive-or operation performed on the two inputs, on a bit location by bit location basis. The last cipher block 101n in the series is provided with the combination of (i) the output of the previous block, and (ii) the result ΣP of a series of exclusive or operations performed on the sequence of plain-text blocks P1, P2, . . . Pm. This combination is the result of the exclusive or operation performed on the two inputs.

The output of the first cipher block 101a is the first block of cipher-text C0. The other blocks of cipher-text, C1-Cm, are obtained by performing the exclusive or operation, on a bit location by bit location basis, on the output of each cipher block and a respective one of the P values. Specifically, P1-PM, are applied to the outputs of blocks 101b through 101m respectively, while ΣP is applied to the output of the last block 101n.

Figure 6:
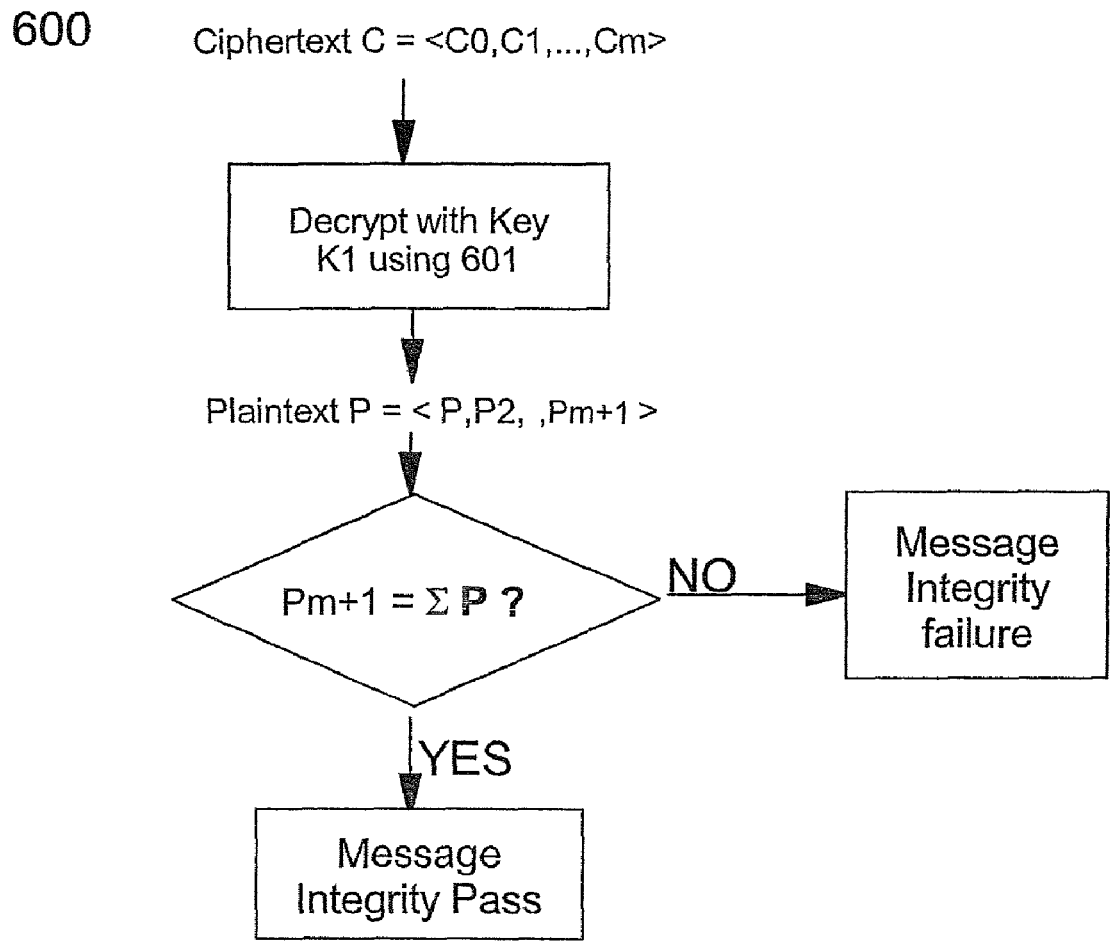
FIG. 6 generally illustrates an example of a prior art decryption process.

FIG. 6 generally illustrates an example of a decryption process. In this process, the cipher-text blocks are applied to decryption 601 (shown in FIG. 7), which outputs the plain-text blocks P. Then these plain-text blocks are used to determine if Pm+1 is equal to the result obtained by applying the exclusive or function, on a bit location by bit location basis, to the sequence of the plain-text blocks P1, . . . Pm. The message passes or fails the integrity test if Pm+1 is, respectively, equal or not equal to this result.

Figure 7:
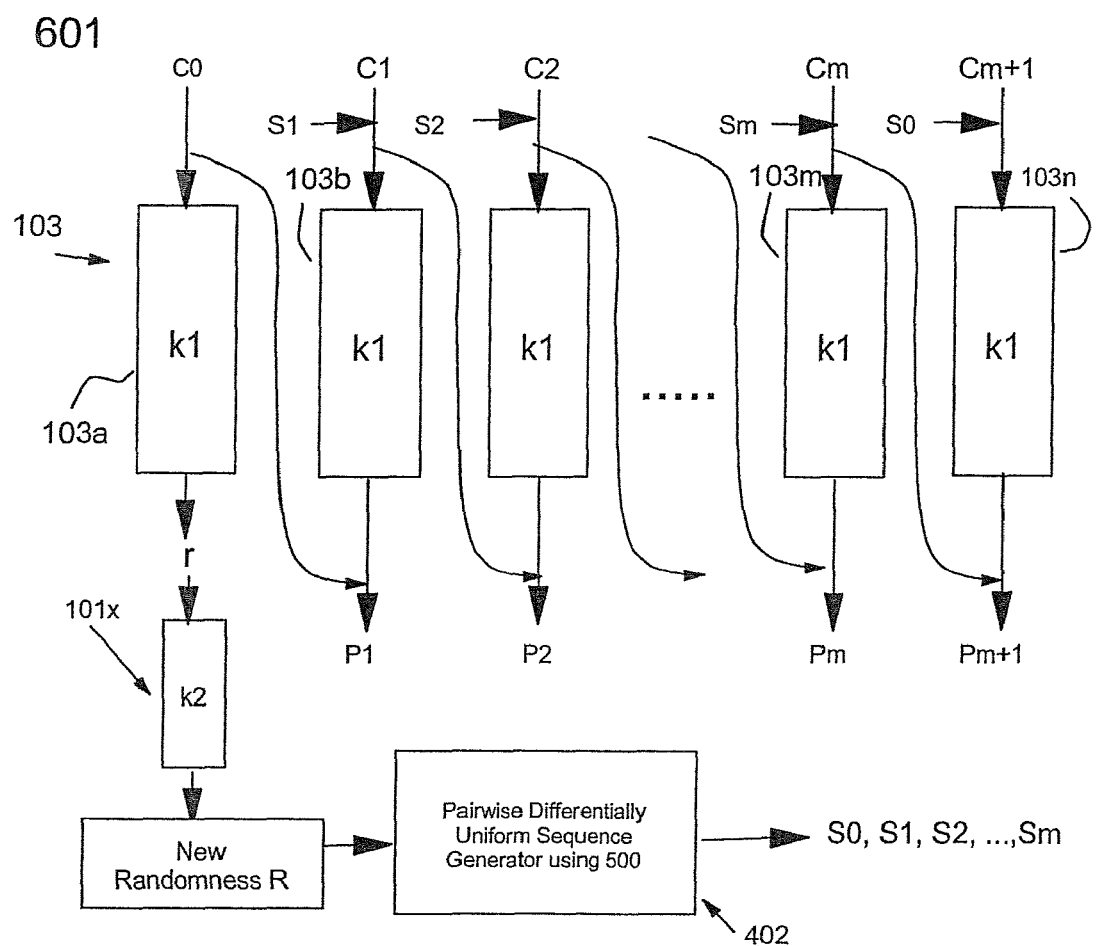
FIG. 7 shows the operation of a prior art decryption process in more detail.

FIG. 7 illustrates the operation of an example of a decryption 601 in greater detail. As shown in this figure, the decryption includes a series of cipher blocks 103 in decrypt or inverse mode. Each of the cipher blocks is provided with a key K1, and with a respective one of the cipher-text blocks C0, . . . Cm+1. Each of these blocks, except the first one 103a, is also provided with a respective one of the S values. In particular, blocks 103b through 103m are provided with Si through Sm respectively, and the last cipher block 103n is provided with S0. The exclusive or operation is performed on the C and S values provided to each cipher block.

The output of the first cipher block 103a is the random number r. For each of the cipher blocks 103b-103n, the exclusive or function is applied to the output of the block and the input to the previous block to obtain a respective one of the plain-text blocks P1-Pm+1.

The pseudo code below is an alternative way to generate the pair-wise differentially uniform random sequence S0, S1, . . . Sm. Again, this alternative way uses a primitive polynomial g(x), and arithmetic in a Galois Field.

| | |
|---|---|
| C01 | W(0) = R; S(0) = W(0); |
| C02 | for i = 1 to m−1 do |
| C03 |    j=i+1; |
| C04 |    if (j is a power of 2) |
| C05 |       W(i) = W(i−1) <<1 /* left shift K(i−1) by 1 bit) */ |
| C06 |       if (most significant bit of W(i-1) is 1) then W(i) = W(i) xor g |
| C07 |    endif |
| C08 |    S(i) =0 |
| C09 |    for k = 0 to n−1 do |
| C10 |       if (least significant bit of j is 1) then S(i) = S(i) xor W(k) |
| C11 |       j = j >>1 /* right shift j by 1 bit */ |
| C12 |    end for |
| C13 | end for |

There is yet another well-known technique for generating the pair-wise differentially uniform random sequence S0, S1, . . . , Sm. Once again, it uses a primitive polynomial g(x). Below is the pseudo code for generating the sequence using the well know Gray code:

| | | |
|---|---|---|
| D01 | W(0)=R; S(0) = W(0) | |
| D02 | for i=1 to m−1 do | |
| D03 |    j=i+1 | |
| D04 |    k=0 | |
| D05 |    While ( (j&1) == 0) do | |
| D06 |       k= k+1; j = j>>1; | /*increment k and right shift j */ |
| D07 |    end while | /* finds the index of the least significant ON bit in (i+1) */ |
| D08 |    if (j xor 1) == 0) | /* (i+1) is a power of 2 */ |
| D09 |       W(k) = W(k−1) <<1 | /* left shift W(k−1) by 1 bit*/ |
| D11 |       if (most significant bit of W(k−1) is 1) then W(k) = W(k) xor g | |
| D12 |    end if | |
| D13 |    S(i) = S(i−1) xor W(k) | |
| D14 | end for | |

There are many other ways to generate such pair-wise differentially uniform sequence. As long as the sequence satisfies the pair-wise differentially uniform property it can be embedded as explained above to guarantee an encryption scheme with message integrity.

Figure 8:
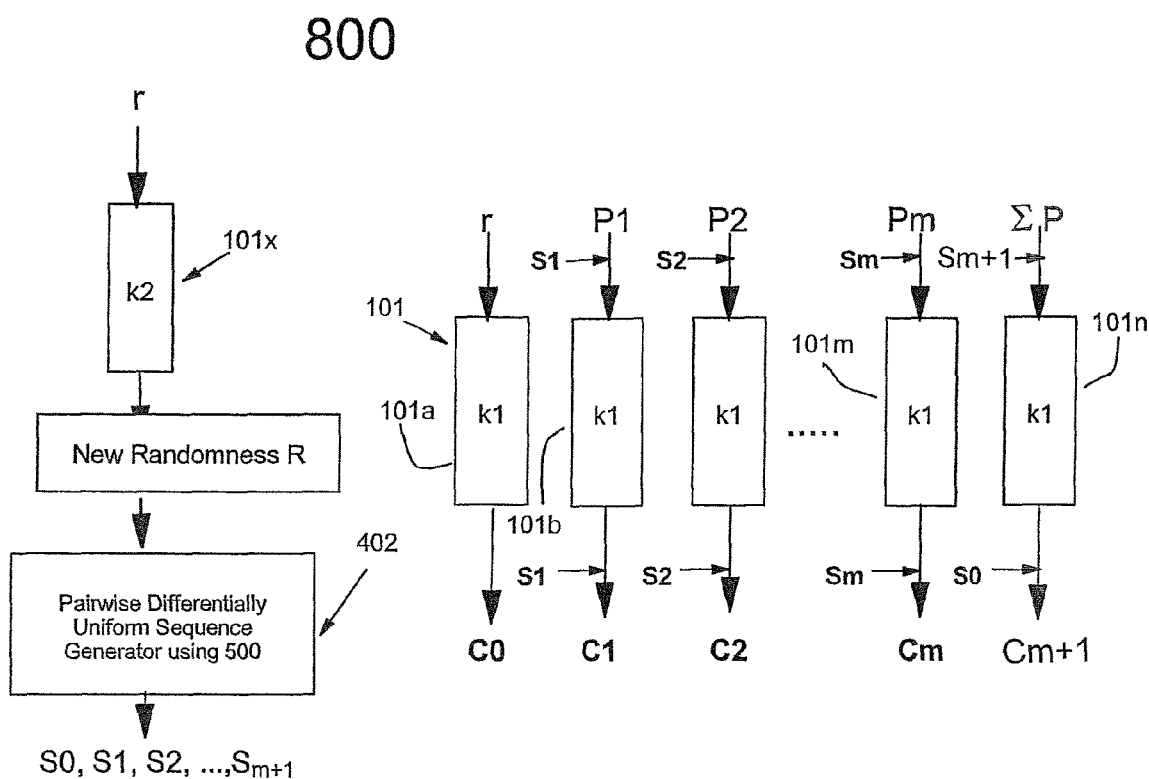
FIG. 8 illustrates a prior art parallelizable encryption mechanism.

FIG. 8 illustrates a parallelizable encryption mechanism 800. In this mechanism, each of the blocks is provided with the key K1. The first block 101a is also provided with the random number r. Each of the following cipher blocks, except the last one, is provided with a combination of a respective one of the plain-text blocks and a respective one of the S values. Specifically, this combination is the result of the exclusive or operation performed on the two inputs, on a bit location by bit location basis. The last cipher block 101n in the series is provided with the combination of (i) Sm+1 and (ii) the result ΣP of a series of exclusive or operations performed on the sequence of plain-text blocks P1, P2, . . . , Pm. This combination is the result of exclusive or operation performed on the two inputs.

As with the system in FIG. 4, the output of the first cipher block 101a of mechanism 800 is the first blocks of cipher-text C0. The other blocks of cipher-text C1-Cm are obtained by performing the exclusive or operation, on a bit location by bit location basis, on the output of each cipher block and a respective one of the S values. Specifically S1-Sm are applied to the outputs of blocks 101b-101m respectively, while S0 is applied to the output of the last cipher block in the series.

Figure 9:
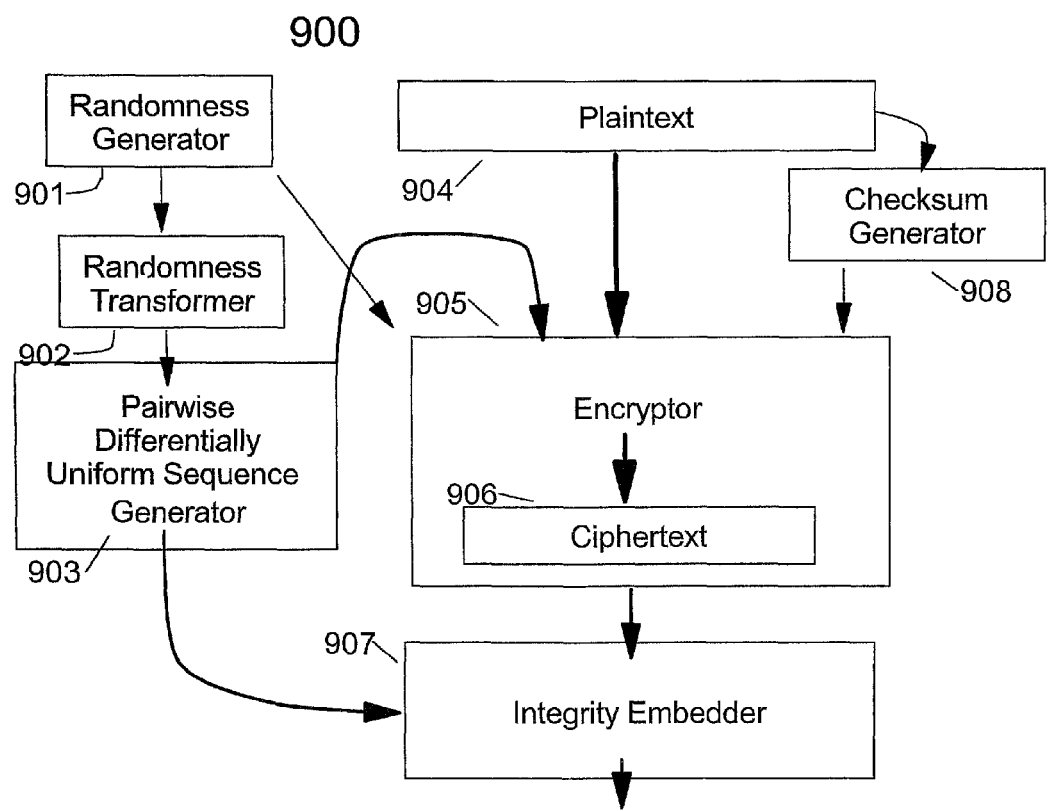
FIG. 9 shows a prior art apparatus for encryption with message integrity.

FIG. 9 shows an apparatus 900 for encryption with message integrity. The apparatus shown includes a Randomness Generator 901 to generate a first random number; a Randomness Transformer 902 to transform said first random number into a first pseudo random number; a Pairwise Additively Uniform Sequence Generator 903 to further expand a randomness of said first random number and/or said first pseudo random number into a set of pair-wise differentially-uniform pseudo random numbers; an Encryptor 905 to divide said plain-text message into a plurality of plain-text blocks, and to encrypt said plain-text blocks to form a plurality of cipher-text blocks; a Checksum Generator 908 to combine said plurality of plain-text blocks into at least one check sum; and an Integrity Extractor and Checker 907 to employ said set of pair-wise differentially-uniform pseudo random numbers, together with said first random number and/or said first pseudo random number, to embed a message integrity check in said cipher-text blocks.

Figure 10:
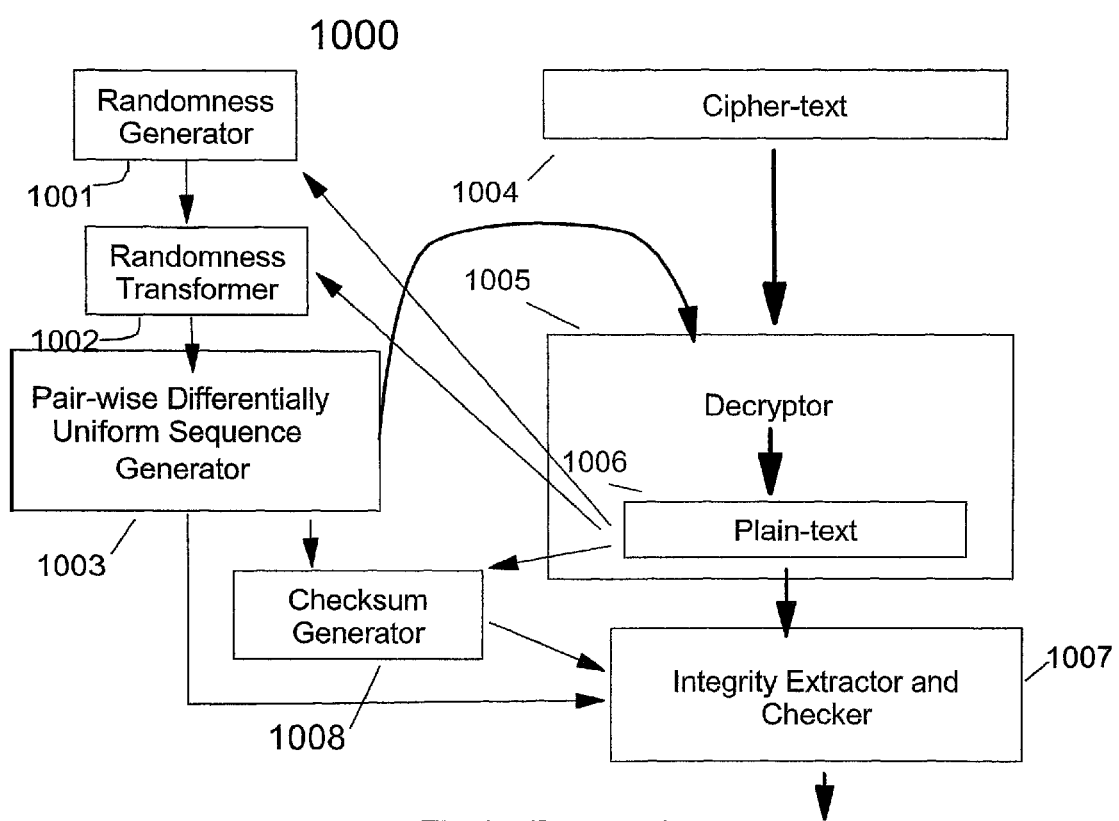
FIG. 10 depicts a prior art apparatus for decryption.

FIG. 10 shows an apparatus 1000 for decryption. The apparatus shown includes a Decryptor 1005 to divide said cipher-text message 1006 into a plurality of cipher-text blocks, and to decrypt said cipher-text blocks in forming a plurality of plain-text blocks 1006; a Randomness Transformer 1002 to transform at least one of said plain-text blocks into a first pseudo random number; a Pairwise Additively Uniform Sequence Generator 1003 to further expand at least one of said plain-text blocks and/or said first pseudo random number into a set of pair-wise differentially-uniform pseudo random numbers; a Checksum Generator 1008 to combine said first pseudo random number, and/or said set of pair-wise differentially-uniform pseudo random numbers, and/or said at least one plain-text block to form at least two check sums and to form a plurality of output blocks; and an Integrity Extractor and Checker 1007 to compare said at least two check sums in declaring success of a message integrity check.

So far, we have described methods known in prior art for authenticated encryption, i.e. encryption with message integrity in a single pass. Some of the methods described were also parallelizable.

Figure 11:
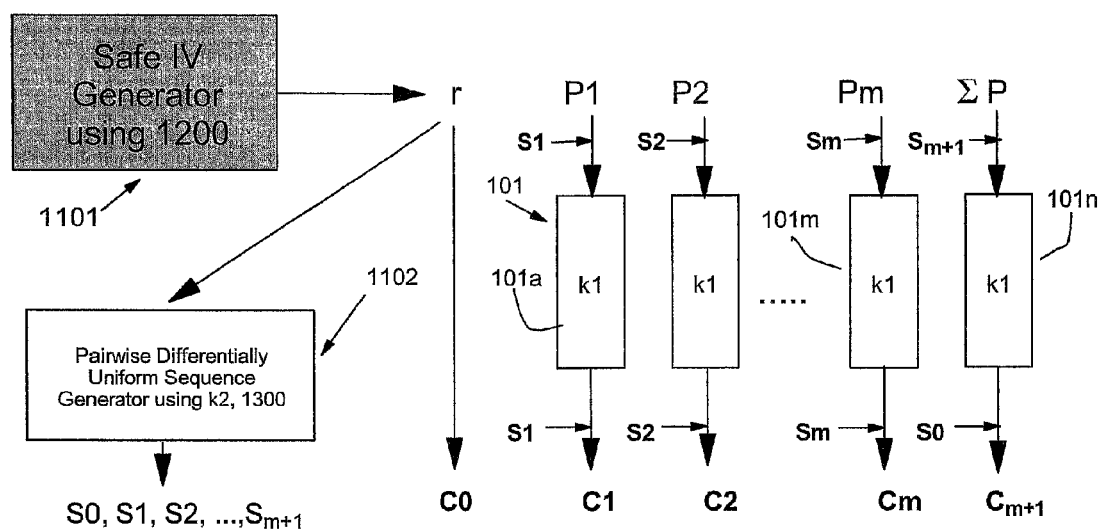
FIG. 11 illustrates an encryption process embodying the present invention.

FIG. 11 describes the present invention, which can be compared with prior art FIG. 8. Instead of using block cipher 101*x* to expand randomness r into new randomness R, the present invention does not require a block cipher. Instead, a Safe IV (or initial vector) generator 1101 is used to generate r in such a fashion that there is no need to convert r to R before applying the pair-wise differentially uniform sequence generator. The pair-wise differentially uniform sequence generator in FIG. 11 is now labeled 1102, as it uses the process 1300 described below in connection with FIG. 13, instead of the process 500 of FIG. 5. As will be clear later, there is a change in process 1300 from process 500. As we will show in various embodiments, the use of the safe IV generator eliminates the need for the costly step of block cipher 101*x*. Even though it may seem that step 101*x*, which is a block cipher invocation, is identical in cost to step 101*a* to 101*n*, which are also block cipher invocations, one must note that the steps 101*a* to 101*n* can be performed in parallel, whereas 101*x* of process 800 must be performed before any of the 101*a* to 101*n* steps can be performed. Further, there are applications where there are at most one or two steps 101 in processes 800 or 1100, i.e. m=0 or 1.

Figure 12:
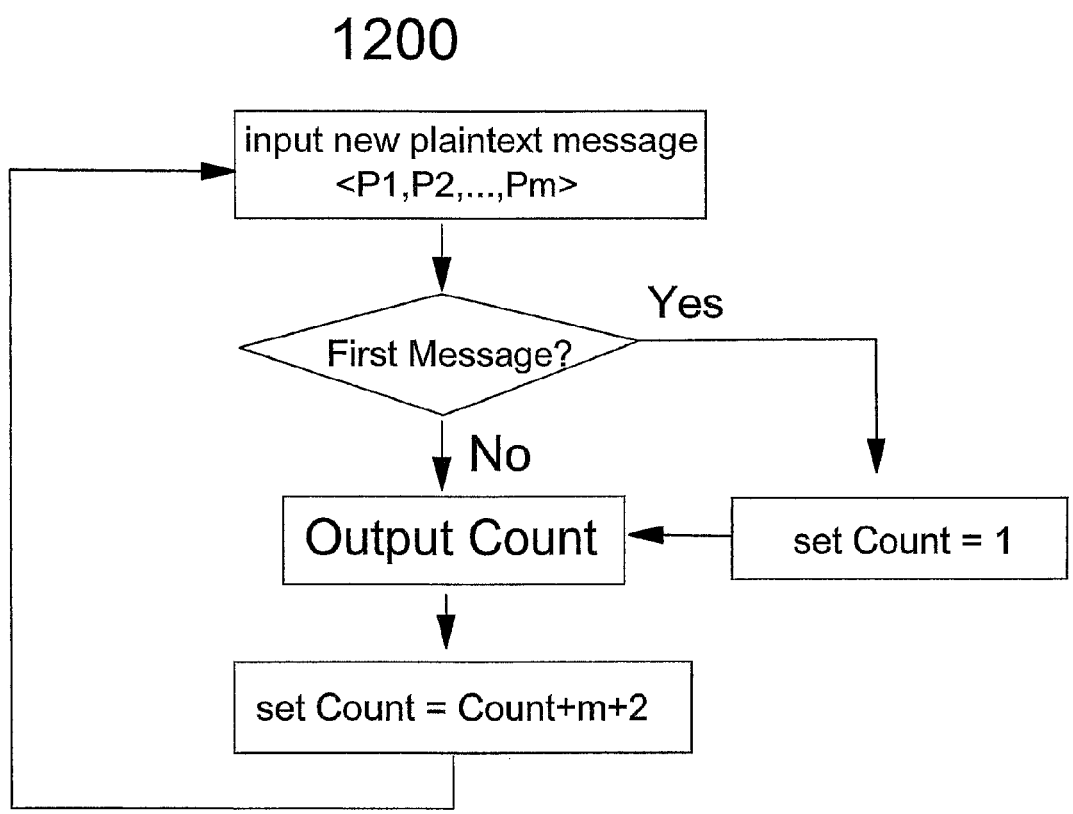
FIG. 12 describes a procedure for generating a safe initial vector.

FIG. 12 describes an embodiment of safe IV generator. For the first message to be encrypted using the secret key, the initial vector is set to 1, and a variable count is also set to 1. Thereafter, the initial vector for the next message is computed to be initial vector of the previous message plus the length of the previous message in blocks plus two. As is clear, from FIG. 12, this implementation saves tremendously over using a block cipher as done in prior art.

Figure 13:
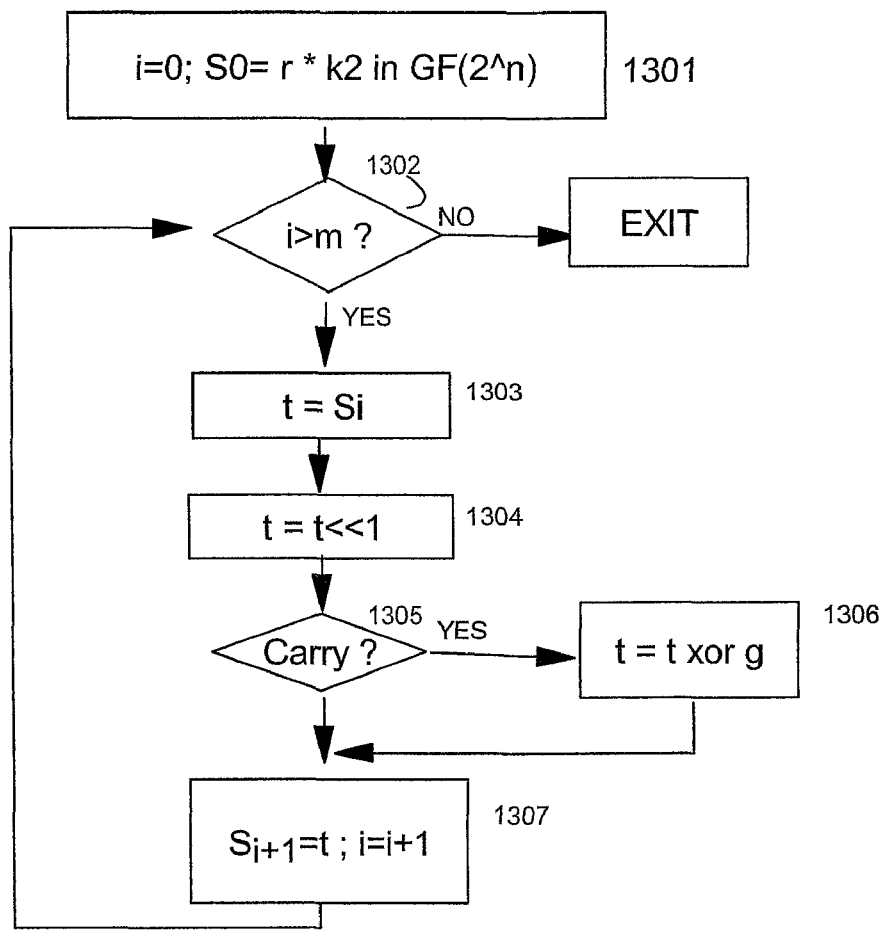
FIG. 13 is a flow chart showing the operation of a pair-wise differentially uniform sequence generator according to an embodiment of the present invention.

FIG. 13 describes how the new pair-wise differentially uniform sequence generator 1300 is implemented. It can be contrasted with process 500. Note that the only change is in the first step, i.e. 1301, where instead of using R as in 501, S0 is set to r multiplied by the key k2 in Galois Field GF(2^n). This multiplication step can be rather expensive, and we see in the next embodiment, how this step can also be removed.

Figure 14:
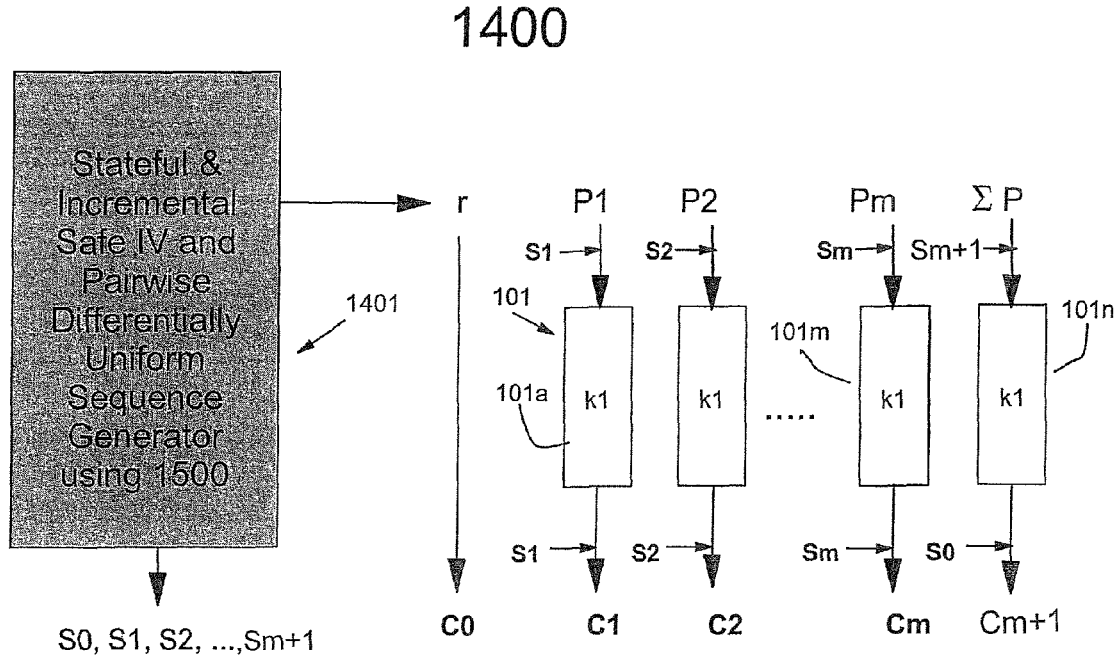
FIG. 14 illustrates an alternate encryption process embodying this invention.

FIG. 14 describes another embodiment of the current invention, where the step of generating the safe IV, and the step of generating the pair-wise differentially uniform sequence are combined into one step 1401. The overall advantage of this combination is that it generates both the initial vector r and the pair-wise differentially uniform sequence incrementally, even across different messages. It is called stateful as it maintains a state from one message encryption to the next.

Figure 15:
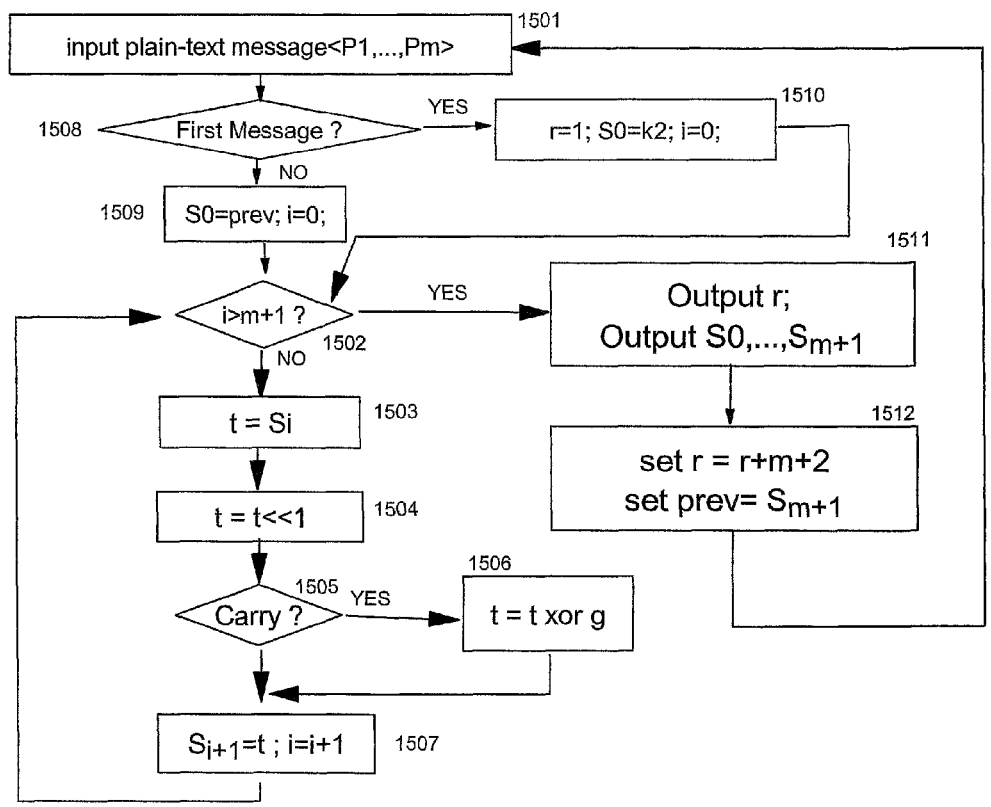
FIG. 15 is a flow chart showing how the generator of FIG. 14 operates.

FIG. 15 is a flow chart 1500 showing how generator 1401 works. This generator works as a well-known Linear Feedback Shift Register (LFSR) as in FIG. 5, except that it is incremental over all messages. As in generator 500, first a primitive polynomial g(x) representing the Galois Field GF(2^n) is chosen. Let g stand for the n-bit number representing g(x)−x^n. Step 1501 is to input the plain-text message. Steps 1502 to 1507 are identical to steps 502 to 507. These steps multiply the current S value Si represented as a polynomial by x in the field GF(2^n). The novel parts include the steps 1508 to 1512. The initial vector to be output is maintained in variable r, which is set to 1 for the first message ever to be encrypted using the current secret key.

Also, for the first message, S0 is initialized in step 1510 to the second secret key k2. If this plain-text message is not the first message, then S0 is initialized to variable "prev", which is the previous message's computed values S[m+1]. After the sequence S0 to S[m+1] is computed, as checked by step 1502, in step 1511, the initial vector r and the sequence S is output. Thereafter in step 1512, r is incremented to its current value plus the length m of the current message plus 2, and saved in r to be used for the next message. Also, the variable "prev" is set to the just computed S[m+1].

An important advantage of the current invention also comes from formally proving that the safe initial vector scheme and the incremental generator 1500 scheme are as secure as prior art for authenticated encryption.

The secret value k2, which is an additional key apart from the key k1 used in 101*a* to 101*n* in FIG. 14, can actually be generated from key k1 itself by encrypting a constant, e.g. zero, with key k1 and the given block cipher 101. It can be proven that this way of generating k2 from k1 is secure.

Figure 16:
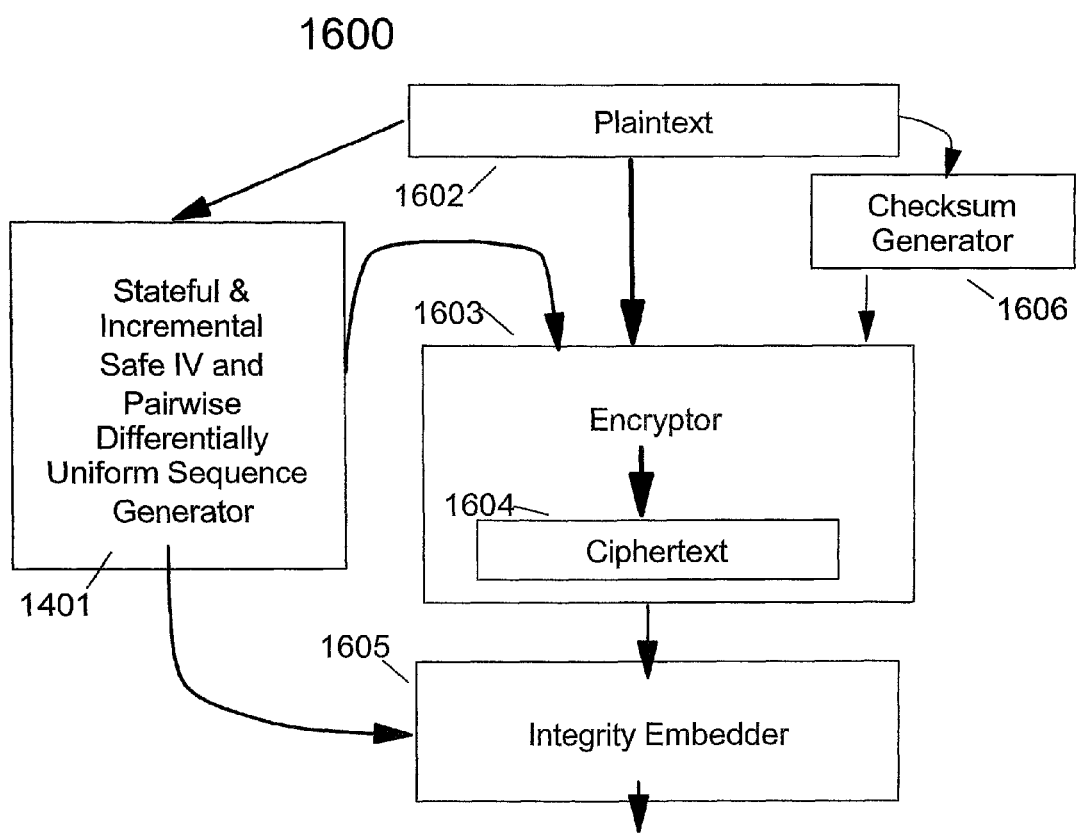
FIG. 16 shows an apparatus for encryption with message integrity using the generator of FIG. 14.

FIG. 16 shows an apparatus 1600 for encryption with message integrity with the advanced incremental differentially uniform sequence generator 1401. The apparatus includes an Encryptor 1603 to divide said plain-text message 1602 into a plurality of plain-text blocks, and to encrypt said plain-text blocks to form a plurality of cipher-text blocks 1604; a Checksum Generator 1606 to combine said plurality of plain-text blocks into at least one check sum; and an Integrity Extractor and Checker 1605 to employ said set of pair-wise differentially-uniform pseudo random numbers to embed a message integrity check in said cipher-text blocks.

Figure 17:
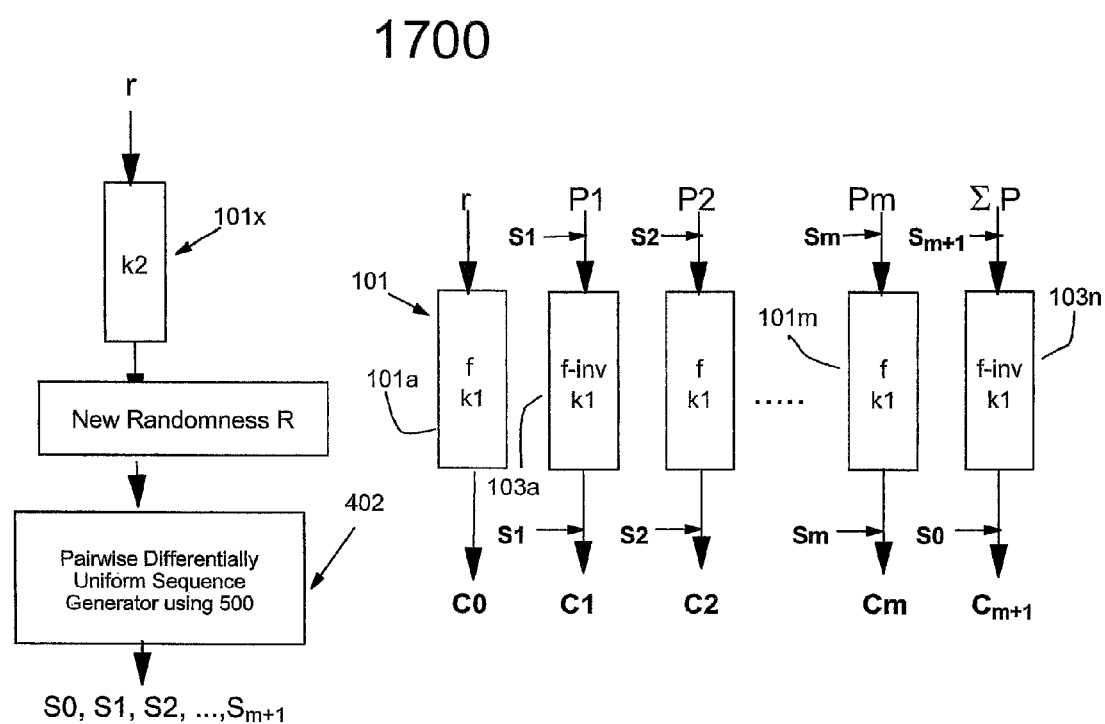
FIG. 17 shows a method for authenticated encryption that uses both an encryptor and a decryptor.

FIG. 17 describes a novel method 1700 for authenticated encryption in that it uses both the encryptor 101 and decryptor 103 while encrypting a long message. In contrast, in the prior art, e.g. see FIGS. 4 and 8, while encrypting a long message, the same encryptor 101 was used on all message blocks. Similarly, while decrypting a long message in the prior art (see FIG. 7) the same decryptor 103 was used on all blocks. An important aspect of the method described in FIG. 17 is that while encrypting a long message, the said plain-text blocks (as in FIG. 8) can be divided into two sets; on the first set, the encryptor 101 can be employed, and on the second set, decryptor 103 can be employed. This has the advantage that most hardware solutions have both an engine for 101 and for 103, and by this invention one can double the throughput.

Figure 18:
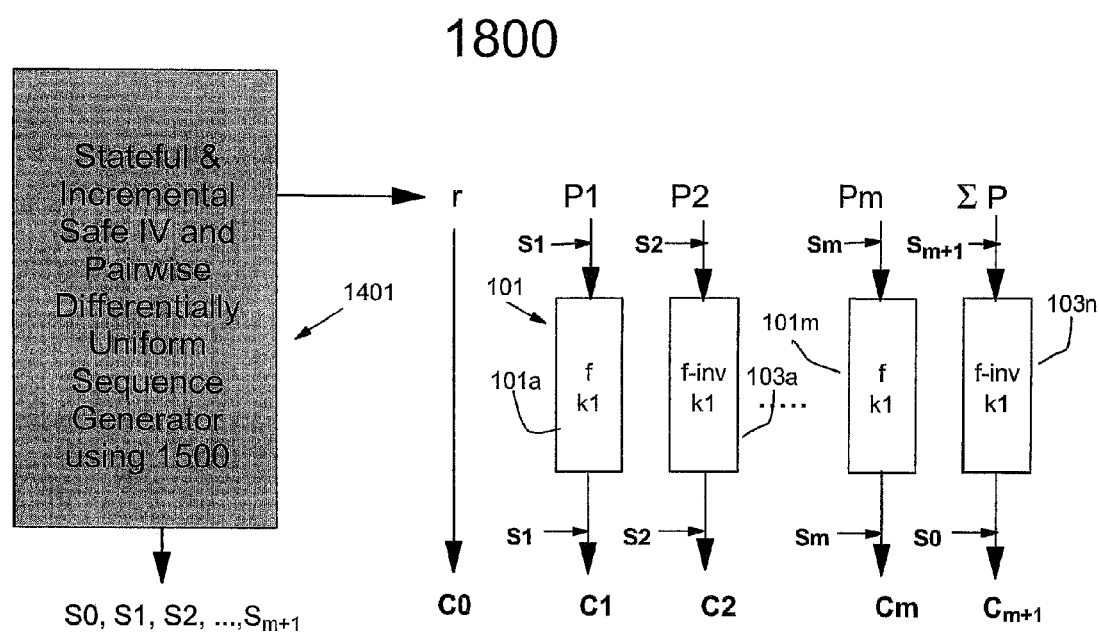
FIG. 18 illustrates an alternate authenticated encryption process.

FIG. 18 describes the alternate embodiment 1800 of this invention, as it incorporates the invention described in FIG. 14 as well. Note that decryptor 103 is used on some blocks, whereas encryptor 101 is used on other blocks. An important aspect of this invention is that it comes with a proof that by doing so, there is no impact on the security of the scheme.

Figure 19:
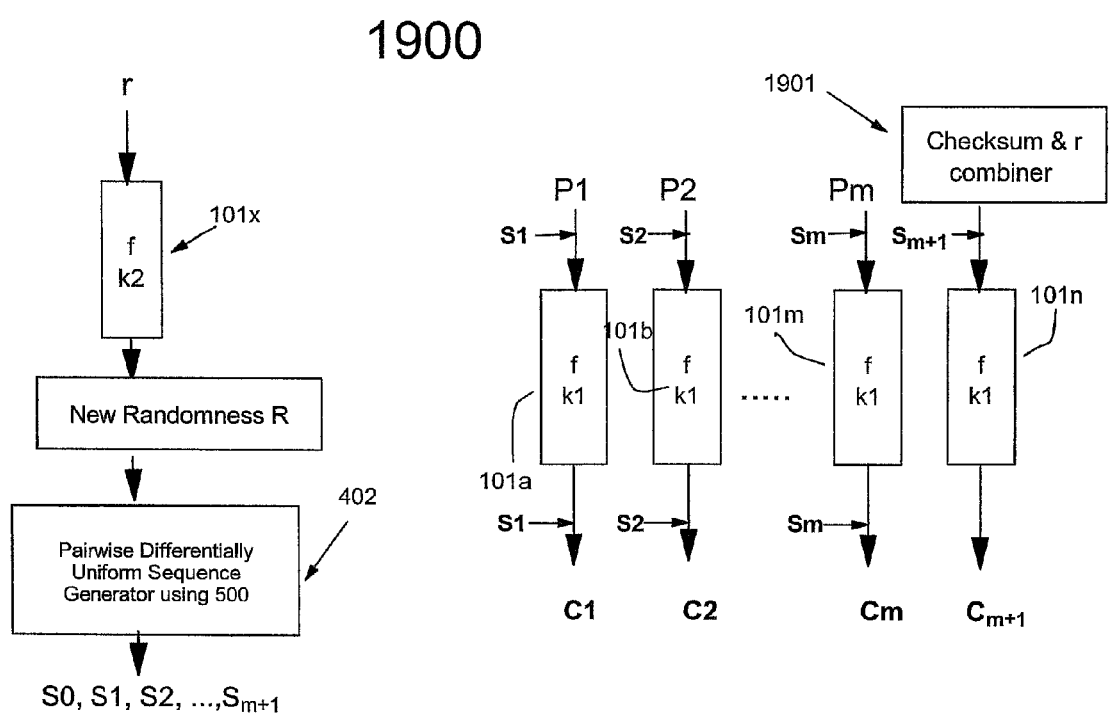
FIG. 19 describes a further alternate embodiment of the present invention, which reduces the size of the output message.

FIG. 19 describes an alternate embodiment 1900 of authenticated encryption, which reduces the size of the output message by one block. This may be advantageous in situations where the output must be stored in a storage device, and which has limited storage space. This figure should be compared with FIG. 8 (prior art). An important distinction is that there is no output block C0, and the input to encryptor 101n is different. The value r, which was previously output as C0, is now incorporated into C[m+1] by means of checksum & r combiner 1901. Note that, there is no post-whitening by S0 to the output of 101n (compare with FIG. 8). This is important as S0 depends on r, and if the decrypting process does not have access to r, it cannot compute S0. However, it can be proven that this scheme is as secure as authenticated encryption schemes in the prior art.

Figure 20:
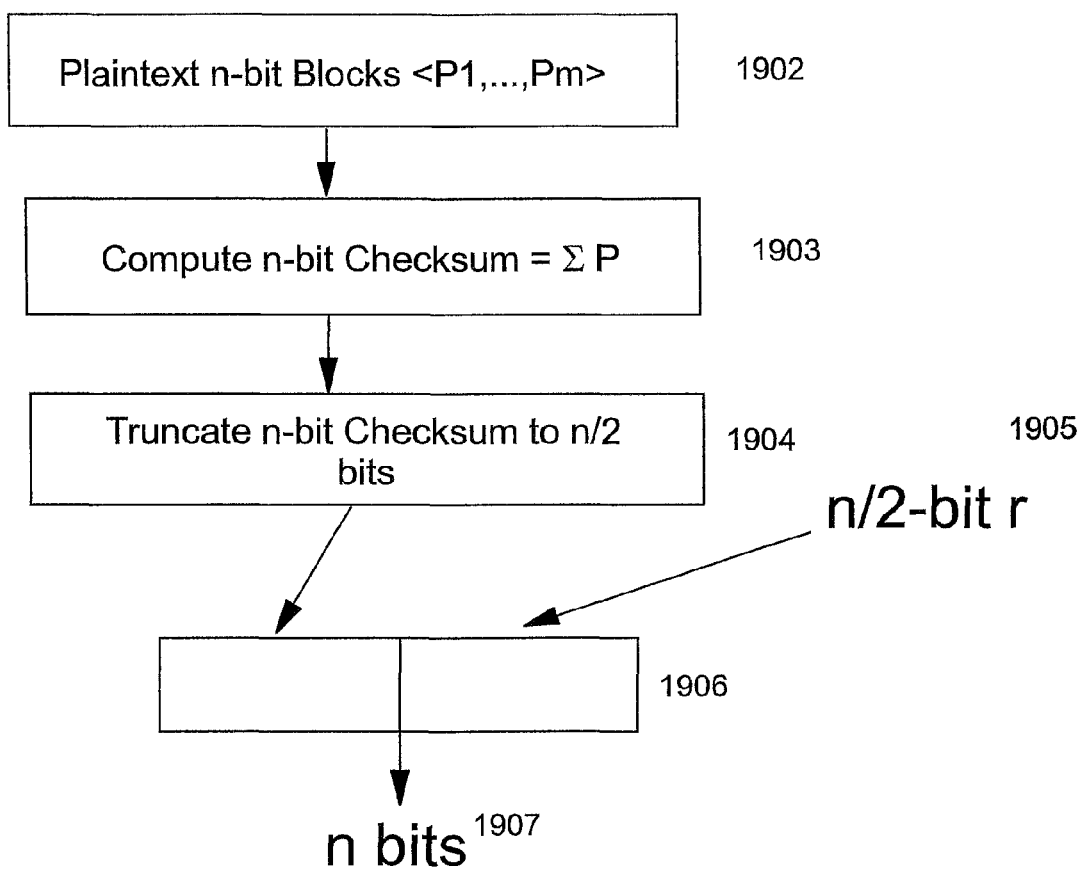
FIG. 20 describes the operation of the checksum and R combiner of FIG. 19.

FIG. 20 describes the checksum & r combiner 1900. The Plaintext blocks are represented at 1902. First, at 1902, an n-bit checksum is computed from the said plaintext-blocks (as in FIG. 8). For example, while using AES with 128 bits, n=128.

Next, at 1904, the checksum is truncated to be n/2 bits, i.e. 64 bits in the case of AES example. Next, this embodiment assumes that r itself can be represented unambiguously by only n/2 bits, as shown at 1905. Hence, at 1906, the truncated checksum and r are concatenated to produce n bits, as shown at 1907.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general-purpose computer system with a computer program that, when loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation and/or reproduction in a different material form.

Other beneficial results can be realized by applying the disclosed invention in a different manner or modifying the invention in ways known to those familiar with the art.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method for encrypting a sequence of plain-text messages using an n-bit block-cipher, the method comprising:
choosing first and second secret keys;
initializing an initial vector;
initializing a pair-wise differentially uniform sequence generator using the said second secret key and the said initial vector;
inputting at least one of a plurality of plain-text messages into an encryptor comprising a series of cipher blocks;
generating a sequence of pair-wise differentially uniform random numbers using the said pair-wise differentially uniform sequence generator;
updating the pair-wise differentially uniform sequence generator;
updating the said initial vector;
processing said at least one of a plurality of plain-text messages, and the said initial vector, and the said pair-wise differentially uniform random numbers, and the said first secret key, in the said encryptor to produce at least one of a plurality of encrypted cipher-text messages with embedded message integrity check, including separating said one of the plain-text messages into a plurality of plain-text blocks, combining each of the plain-text blocks with a respective one of said differentially uniform random numbers to generate a plurality of resultant text blocks and passing the plurality of resultant text blocks concurrently, in parallel through the series of cipher blocks, including passing each of the resultant text blocks through a respective one of the cipher blocks to produce said at least one of a plurality of encrypted cipher-text messages with embedded message integrity check in a single pass of the one of the plain-text messages through said series of cipher blocks; and
using one or more processing units, executing an encryption program, to perform said processing.

2. A method as in claim 1, wherein the step of choosing the said first and second secret keys includes the step of using a key-agreement protocol to choose said first and second keys.

3. A method as in claim 1, wherein the step of choosing the first and second secret keys includes the step of choosing said first and second secret keys randomly and independently.

4. A method as in claim 1, wherein the step of choosing the said first and second secret keys includes the step of choosing the said first key using a key-agreement protocol and deriving the said second secret key using a key derivation function.

5. A method as in claim 4, wherein the step of deriving the said second secret key using a key derivation function includes the step of using the said first secret key to derive the second secret key.

6. A method as in claim 5, wherein the said key derivation function is the said block-cipher.

7. A method as in claim 1, wherein the step of initializing the initial vector includes the step of setting the initial vector to an n or lesser number of bits size constant value.

8. A method as in claim 1, wherein the step of initializing the initial vector includes the step of setting the initial vector to an n or lesser number of bits size random value.

9. A method as in claim 1, wherein the step of initializing the pair-wise differentially uniform sequence generator includes the step of setting the said generator to the said second secret key.

10. A method as in claim 1, wherein the step of initializing the pair-wise differentially uniform sequence generator includes the step of setting the said generator to the product of said second secret key and the said initial vector.

11. A method as in claim 10, wherein the product is in Galois Field two to the power n.

12. A method as in claim 10, wherein the product is in a prime Galois field.

13. A method as in claim 1, wherein the step of initializing the pair-wise differentially uniform sequence generator includes the step of using the said block-cipher and/or the said initial vector.

14. A method as in claim 1, wherein the said sequence of pair-wise differentially uniform sequence is pair-wise differentially uniform in a prime Galois field.

15. A method as in claim 1, wherein the said sequence of pair-wise differentially uniform sequence is generated incrementally.

16. A method as in claim 1, wherein the step of updating the pair-wise differentially uniform sequence generator includes the step of setting the generator to the last element of the said sequence of pair-wise differentially uniform random numbers.

17. A method as in claim 1, wherein the step of updating the initial vector includes the step of adding to the initial vector a value obtained from the length of the said one of a plurality of plain-text messages.

18. A method as in claim 17, wherein the adding step includes the step of computing the length in n-bit blocks of the said one of a plurality of plain-text messages and incrementing said length by a constant.

19. A method as in claim 1, wherein the step of processing includes the steps of:
dividing the said one of a plurality of plain-text messages into a plurality of n-bit plain-text blocks;
combining said plurality of plain-text blocks into at least one checksum block;
encrypting said plurality of plain-text blocks and the said checksum block using the said block cipher and the said first secret key and the said sequence of pair-wise differentially uniform random numbers to obtain a plurality of cipher-text blocks; and
employing the said sequence of pair-wise differentially uniform random numbers to embed a message integrity check in the said plurality of cipher-text blocks.

20. A method as in claim 19, where the step of combining includes the step of computing an n-bit exclusive-or of the said plurality of plain-text blocks.

21. A method as in claim 19, where the step of combining further includes the expanding step of the said initial vector to generate a set of pseudo-random numbers, and using the set of pseudo-random numbers to embed the message integrity check in the at least one of a plurality of cipher-text messages during said single pass.

22. The method as in claim 21, wherein the said initial vector is represented using only n/2 bits, and concatenating the said initial vector with a n/2-bit truncated exclusive-or sum of the said plurality of plain-text blocks to obtain the checksum block.

23. A method as in claim 19, wherein the step of encrypting includes the step of pairing the said plurality of plaintext blocks along with the said checksum block with the said sequence of pair-wise differentially uniform random numbers; and for each said pair computing a cipher-text block using the block cipher and the said first secret key.

24. A method as in claim 23, wherein the step of computing a cipher-text block using the block cipher includes the step of employing the said block cipher in the encrypt mode with the said first secret key.

25. A method as in claim 23, wherein the step of computing a cipher-text block using the block cipher includes the step of employing the said block cipher in the decrypt mode with the said first secret key.

26. A method as in claim 19, wherein the step of encrypting includes the steps of pairing the said plurality of plaintext blocks along with the said checksum block with the said sequence of pair-wise differentially uniform random numbers; and further partitioning the said pairs into two sets, and for each pair in the said first set computing a cipher-text-block using the said block cipher and the said first secret key by employing the said block cipher in the encrypt mode, and for each pair in the said second set computing a cipher-text block using the said block cipher and the said first key by employing the said block cipher in the decrypt mode.

27. A computer program product comprising an article of manufacture including a tangible computer readable medium having computer readable program code logic tangibly embodied therein to execute instructions in one or more processing units for causing encryption of a plain-text message, the computer readable program code, when executing in the one or more processing units causing said one or more processing units to execute the steps of claim 1.

28. The computer program product as in claim 27, wherein the step of initializing the pair-wise differentially uniform sequence generator involves setting the said generator to the said second secret key.

29. The computer program product as in claim 27, wherein the step of initializing the pair-wise differentially uniform sequence generator involves setting the said generator to the product of said second secret key and the said initial vector.

30. A program storage device readable by machine, tangibly embodying a program of instructions executable by the machine to perform method steps for encrypting a plain-text message, the method steps comprising:
choosing first and second secret keys;
initializing an initial vector;
initializing a pair-wise differentially uniform sequence generator using the said second secret key and the said initial vector;
inputting at least one of a plurality of plain-text messages into an encryptor comprising a series of cipher blocks;
generating a sequence of pair-wise differentially uniform random numbers using the said pair-wise differentially uniform sequence generator;
updating the pair-wise differentially uniform sequence generator;
updating the said initial vector;
processing said at least one of a plurality of plain-text messages, and the said initial vector, and the said pair-wise differentially uniform random numbers, and the said first secret key, in the said encryptor to produce at least one of a plurality of encrypted cipher-text messages with embedded message integrity check, including separating said one of the plain-text messages into a plurality of plain-text blocks, combining each of the plain-text blocks with a respective one of said differentially uniform random numbers to generate a plurality of resultant text blocks and passing the plurality of resultant text blocks concurrently, in parallel through the series of cipher blocks, including passing each of the resultant text blocks through a respective one of the cipher blocks to produce said at least one of a plurality of encrypted cipher-text messages with embedded message integrity check in a single pass of the one of the plain-text messages through said series of cipher blocks; and; wherein:

the step of choosing the said first and second secret keys includes the steps of choosing the said first key using a key-agreement protocol and deriving the said second secret key using a key derivation function;

the step of initializing the initial vector includes the step of setting the initial vector to an n or lesser number of bits size constant value;

the step of initializing the pair-wise differentially uniform sequence generator includes the step of setting the said generator to the said second secret key; and the step of updating the initial vector includes the step of adding to said initial vector a value obtained from the length of the said one of a plurality of plain-text messages.

31. An apparatus to encrypt at least one of a sequence of plain-text messages, the apparatus comprising:

a generator to generate at least one of a plurality of initial vectors and at least one of a plurality of sequence of pair-wise differentially uniform random numbers using said at least one of the plurality of initial vectors;

an Encryptor to divide at least one of a sequence of said plain-text messages into a plurality of plain-text blocks, and to encrypt said plain-text blocks in a single pass of the plain-text blocks through a series of cipher blocks to form at least one of a plurality of encrypted cipher-text messages;

a Checksum Generator to combine said at least one of a plurality of plain-text blocks into at least one check sum; and message integrity embedder to employ at least one of a plurality of said sequence pair-wise differentially-uniform random numbers, to embed a message integrity check in said at least one of a plurality of cipher-text messages during said single pass of the plain-text blocks through the series of cipher blocks; and wherein:

the Encryptor combines each of the plain-text blocks with a respective one of said differentially uniform random numbers to generate a plurality of resultant text blocks, and passes the plurality of resultant text blocks concurrently, in parallel through the series of cipher blocks, including passing each of the resultant text blocks through a respective one of the cipher blocks to produce the at least one of a plurality of encrypted cipher-text messages.

32. An apparatus according to claim 31, wherein:

the apparatus is for encrypting a plurality of sequences of plain-text messages;

the generator generates a plurality of sequences of pair-wise differentially uniform random numbers; and the Encryptor uses a respective one of the plurality of sequences of pair-wise differentially uniform random numbers to encrypt each of the plurality of plain-text messages.

33. An apparatus according to claim 32, wherein the generator generates a plurality of initial vectors, and uses a respective one of said plurality of initial vectors to generate each of the plurality of pair-wise differentially uniform random numbers.

34. An apparatus according to claim 33, wherein said plurality of initial vectors are generated in a sequence including a first initial vector and subsequent initial vectors, and each of the subsequent initial vectors in the sequence is calculated using the one of the initial vectors in the sequence immediately preceding said each subsequent initial vector.

35. An apparatus according to claim 34, wherein each of said subsequent initial vectors is equal to said immediately preceding initial vector plus a defined value.

* * * * *